US012379019B2

(12) United States Patent
Inoshita et al.

(10) Patent No.: US 12,379,019 B2
(45) Date of Patent: Aug. 5, 2025

(54) SPIRAL ADVANCING AND RETREATING OPERATION DEVICE, BELT MEMBER FOR TUBULAR TELESCOPIC BODY, AND METHOD FOR MANUFACTURING BELT MEMBER FOR TUBULAR TELESCOPIC BODY

(71) Applicant: TOYOTA JIDOSHA KABUSHIKI KAISHA, Aichi-ken (JP)

(72) Inventors: Hirofumi Inoshita, Toyota (JP); Satoshi Kojima, Nissin (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/500,117

(22) Filed: Nov. 2, 2023

(65) Prior Publication Data

US 2024/0191785 A1   Jun. 13, 2024

(30) Foreign Application Priority Data

Dec. 7, 2022   (JP) .................. 2022-195453

(51) Int. Cl.
*F16H 19/06*   (2006.01)
*B21D 22/02*   (2006.01)

(52) U.S. Cl.
CPC ......... *F16H 19/0663* (2013.01); *B21D 22/02* (2013.01)

(58) Field of Classification Search
CPC ... F16H 19/06; F16H 19/0618; F16H 19/0663
See application file for complete search history.

(56) References Cited

U.S. PATENT DOCUMENTS

| | | | |
|---|---|---|---|
| 6,547,216 B1* | 4/2003 | Bouchard | B66F 13/005 254/89 R |
| 2006/0005651 A1* | 1/2006 | Laforest | B66F 11/00 74/425 |
| 2017/0001314 A1* | 1/2017 | Yim | B25J 18/02 |
| 2018/0351247 A1* | 12/2018 | Hall | H01Q 1/1235 |
| 2021/0194388 A1* | 6/2021 | Iwamoto | H02N 2/025 |
| 2021/0214203 A1* | 7/2021 | Erickson | B66F 11/00 |
| 2021/0341040 A1* | 11/2021 | Komura | F16H 9/26 |
| 2021/0341041 A1* | 11/2021 | Iwamoto | F16H 19/0618 |

FOREIGN PATENT DOCUMENTS

| | | |
|---|---|---|
| JP | 2007-192257 A | 8/2007 |
| JP | 2019-138356 A | 8/2019 |
| JP | 2024-000616 A | 1/2024 |

* cited by examiner

*Primary Examiner* — Joseph Brown
(74) *Attorney, Agent, or Firm* — HAUPTMAN HAM, LLP

(57) ABSTRACT

The spiral advancing and retreating operation device forms a tubular telescopic body by spirally wrapping a first belt member and a second belt member disposed inside the first belt member around a common axis line in an overlapping manner in a state in which the first belt member and the second belt member are displaced from each other in a direction of the axis line, in which the first belt member includes a first row of engagement protrusions and a second row of engagement protrusions, the second belt member includes a first row of engagement parts and a second row of engagement parts.

10 Claims, 15 Drawing Sheets

SPIRAL ADVANCING AND RETREATING OPERATION DEVICE, BELT MEMBER FOR TUBULAR TELESCOPIC BODY, AND METHOD FOR MANUFACTURING BELT MEMBER FOR TUBULAR TELESCOPIC BODY

CROSS REFERENCE TO RELATED APPLICATIONS

This application is based upon and claims the benefit of priority from Japanese patent application No. 2022-195453, filed on Dec. 7, 2022, the disclosure of which is incorporated herein in its entirety by reference.

BACKGROUND

The present disclosure relates to a spiral advancing and retreating operation device, a belt member for a tubular telescopic body, and a method for manufacturing the belt member for the tubular telescopic body.

Japanese Unexamined Patent Application Publication No. 2019-138356 discloses a spiral advancing and retreating operation device which constitutes a tubular telescopic body by spirally wrapping a first belt member and a second belt member disposed inside the first belt member in an overlapping manner around a common axis line in a state in which the first belt member and the second belt member are displaced from each other in the direction of the axis line (displaced from each other by half a width).

The first belt member includes a first row of engagement protrusions and a second row of engagement protrusions formed of a plurality of engagement protrusions that are arranged in a longitudinal direction of the first belt member and are convex toward the axis line. On the other hand, the second belt member includes a first row of engagement parts and a second row of engagement parts formed of a plurality of engagement parts arranged in a longitudinal direction of the second belt member. The engagement parts are configured in such a way that the engagement protrusions can be detachably engaged therewith in a state in which the first belt member and the second belt member are spirally wrapped in an overlapping manner. The first belt member includes a flat belt part and a belt part with protrusions (engagement protrusions) alternately arranged in the longitudinal direction of the first belt member.

SUMMARY

However, the belt part with protrusions has a rigidity higher than that of the first belt member (flat belt part) which serves as a base and thus the belt part with protrusions is not likely to be deformed (it is not likely to form a cylindrical shape). Therefore, when the first belt member in which the flat belt part and the belt part with protrusions are alternately arranged is spirally wrapped, the whole tubular telescopic body (spirally wrapped telescopic shaft) has a polygonal shape, not a cylindrical shape, which causes, for example, a problem that, when the first belt member ejected from a storage part of the first belt member is spirally wrapped, the first belt member (corner parts of the polygonal shape) may interfere with a surrounding member.

The present disclosure has been made in order to solve the aforementioned problem and provides a spiral advancing and retreating operation device, a belt member for a tubular telescopic body, and a method for manufacturing the belt member for the tubular telescopic body capable of making the entire tubular telescopic body (spirally wrapped telescopic shaft) have a cylindrical shape, not a polygonal shape, when belt members are spirally wrapped.

A spiral advancing and retreating operation device according to the present disclosure is a spiral advancing and retreating operation device forming a tubular telescopic body by spirally wrapping a first belt member and a second belt member disposed inside the first belt member around a common axis line in an overlapping manner in a state in which the first belt member and the second belt member are displaced from each other in a direction of the axis line, in which the first belt member includes a first row of engagement protrusions and a second row of engagement protrusions formed of a plurality of engagement protrusions that are disposed in a longitudinal direction of the first belt member and are convex toward the axis line, the second belt member includes a first row of engagement parts and a second row of engagement parts formed of a plurality of engagement parts disposed in a longitudinal direction of the second belt member, the engagement part is configured in such a way that the engagement protrusions can be detachably engaged therewith in a state in which the first belt member and the second belt member are spirally wrapped in the overlapping manner, and a part of the first belt member whose rigidity is higher than another surrounding part of the first belt member is curved into a cylindrical shape that corresponds to the tubular telescopic body in advance.

According to the aforementioned configuration, the entire tubular telescopic body (spirally wrapped telescopic shaft) may have a cylindrical shape, not a polygonal shape, when the belt members are spirally wrapped.

This is because a part of the first belt member whose rigidity is higher than the other surrounding part of the first belt member is curved into a cylindrical shape that corresponds to the tubular telescopic body in advance.

Further, in the above spiral advancing and retreating operation device, the first belt member may include a flat belt part and a belt part with engagement protrusions alternately arranged in the longitudinal direction of the first belt member, the belt part with engagement protrusions may include one of the engagement protrusions that forms the first row of engagement protrusions and one of the engagement protrusions that forms the second row of engagement protrusions, and a part of the first belt member whose rigidity is higher than the other surrounding part of the first belt member may be the belt part with engagement protrusions.

Further, in the above spiral advancing and retreating operation device, the belt part with engagement protrusions may be tilted by a predetermined angle with respect to a short-length direction of the first belt member.

Further, in the above spiral advancing and retreating operation device, the part of the first belt member whose rigidity is higher than the other surrounding part of the first belt member may be a first part including one of the engagement protrusions that forms the first row of engagement protrusions of the belt part with engagement protrusions and a second part including one of the engagement protrusions that forms the second row of engagement protrusions of the belt part with engagement protrusions.

Further, in the above spiral advancing and retreating operation device, a radius of the cylindrical shape may be equal to or larger than a radius of the tubular telescopic body.

Further, in the above spiral advancing and retreating operation device, the radius of the cylindrical shape may become larger as a distance from the engagement protrusions increases in the longitudinal direction of the first belt member.

Further, in the above spiral advancing and retreating operation device, the engagement protrusions may be hollow protrusion parts that are integrally formed in the first belt member.

Further, in the above spiral advancing and retreating operation device, the hollow protrusion parts may be hollow conical trapezoidal protrusion parts.

A belt member for a tubular telescopic body according to the present disclosure is a belt member for a tubular telescopic body that is used as a first belt member or a second belt member of a spiral advancing and retreating operation device that forms the tubular telescopic body by spirally wrapping the first belt member and the second belt member disposed inside the first belt member around a common axis line in an overlapping manner in a state in which the first belt member and the second belt member are displaced from each other in a direction of the axis line, the belt member for the tubular telescopic body including: a first row of protrusions and a second row of protrusions formed of a plurality of protrusions that are disposed in a longitudinal direction of the belt member and are convex toward the axis line, in which a part of the belt member whose rigidity is higher than another surrounding part of the belt member is curved into a cylindrical shape that corresponds to the tubular telescopic body in advance.

According to the aforementioned configuration, the entire tubular telescopic body (spirally wrapped telescopic shaft) may have a cylindrical shape, not a polygonal shape, when the belt members are spirally wrapped.

This is because the part of the belt member (the first belt member or the second belt member) whose rigidity is higher than that of the other surrounding part is curved into a cylindrical shape that corresponds to the tubular telescopic body in advance.

A method for manufacturing a belt member for a tubular telescopic body according to the present disclosure is a method for manufacturing the above belt member for the tubular telescopic body including performing press forming on the belt member using a first mold including a first protruding mold part that correspond to the protrusions and a second protruding mold part that corresponds to the cylindrical shape, and a second mold including a first recessed mold part that corresponds to the first protruding mold part and a second recessed mold part that corresponds to the second protruding mold part, whereby the protrusions and the cylindrical shape are concurrently formed.

According to the aforementioned configuration, the protrusions and the cylindrical shape can be concurrently formed in the belt member.

This is because press forming is performed on the belt member using the first mold including the first protruding mold part that corresponds to the protrusions and the second protrusion mold part that corresponds to the cylindrical shape, and the second mold including the first recessed mold part that corresponds to the first protruding mold part and the second recessed mold part that corresponds to the second protruding mold part.

According to the present disclosure, it is possible to provide a spiral advancing and retreating operation device, a belt member for a tubular telescopic body, and a method for manufacturing the belt member for the tubular telescopic body capable of making the entire tubular telescopic body (spirally wrapped telescopic shaft) have a cylindrical shape, not a polygonal shape, when belt members are spirally wrapped.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

First Reference Example

With reference to FIGS. 1 to 9, a telescopic device 60 (a spiral advancing and retreating operation device) according to a first reference example will be described.

Figure 1:
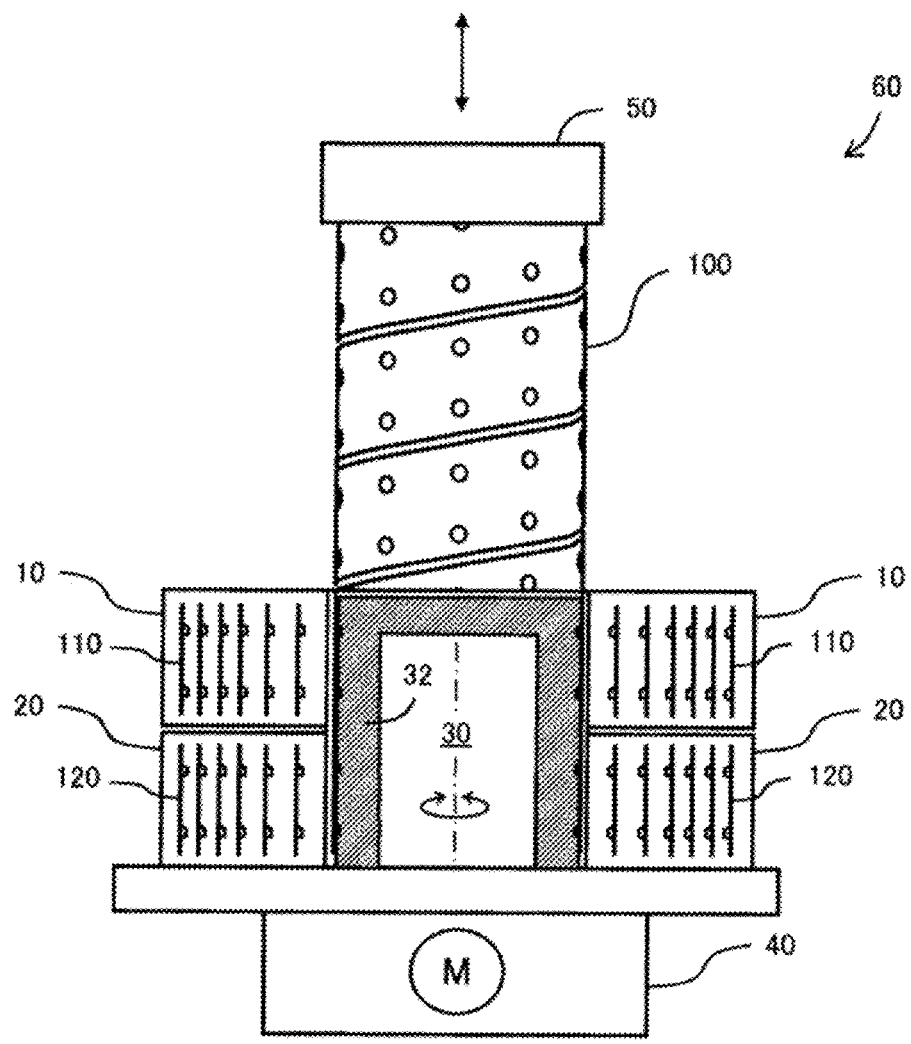
FIG. 1 is an explanatory view showing a configuration of a telescopic device including a spirally wrapped telescopic shaft.

FIG. 1 is an explanatory view showing a configuration of the telescopic device 60 including a spirally wrapped telescopic shaft. The telescopic device 60 according to the first reference example includes a spirally wrapped telescopic shaft 100 formed by spirally wrapping two belt members 110 and 120, a first accommodating part 10 accommodating the first belt member 110, a second accommodating part 20 accommodating the second belt member 120, a guide part guiding the two belt members 110 and 120 and spirally wrapping them, a drive part 40 rotating a guide member 32 of the guide part 30, and a cap part 50 attached to the tip of the spirally wrapped telescopic shaft 100. As the guide member 32 is driven by the drive part 40 and rotates in one direction, the two belt members 110 and 120 are guided by the guide member 32 and spirally wrapped, and the spirally wrapped telescopic shaft 100 extends upward in FIG. 1. As the guide member 32 rotates in the opposite direction, the wrapping of the two belt members 110 and 120 is released, the two belt members 110 and 120 are accommodated in the respective accommodating parts 10 and 20, and the spirally wrapped telescopic shaft 100 is shortened. Instead of rotating the guide member 32, the spirally wrapped telescopic shaft 100 itself may be rotated to expand or contract the spirally wrapped telescopic shaft 100. The belt members 110 and 120 may be formed of metal (for example, a metal having spring properties, such as spring stainless steel). The belt members 110 and 120 may be formed of other materials such as deformable resin.

Figure 2:
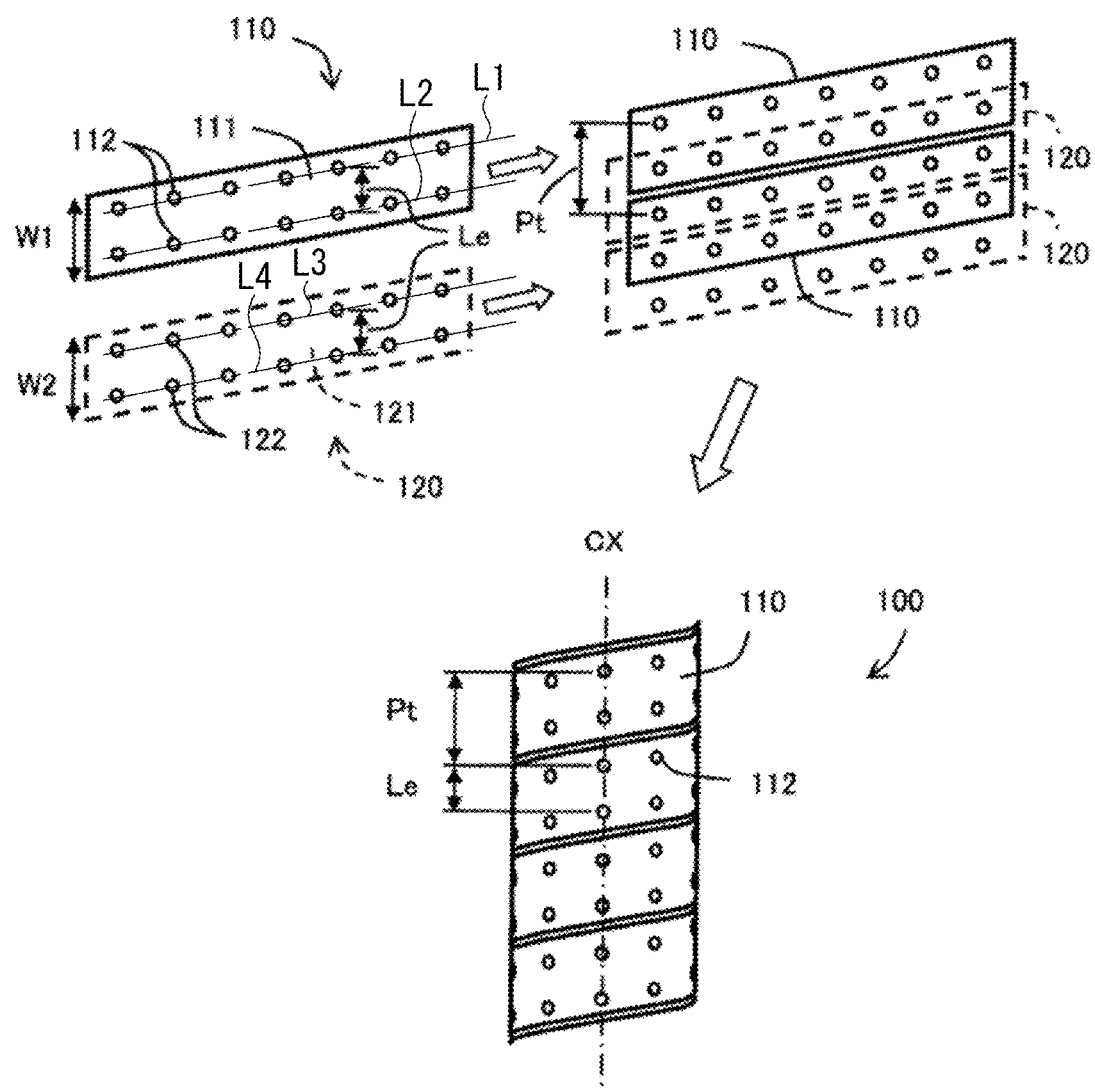
FIG. 2 is an explanatory view showing a state in which the spirally wrapped telescopic shaft is formed.

FIG. 2 is an explanatory view showing a state in which the spirally wrapped telescopic shaft 100 is formed by wrapping the two belt members 110 and 120. In FIG. 2, the outer shape of the second belt member 120 is drawn with a dashed line for convenience of illustration. The upper left of FIG. 2 shows a state before wrapping, and the upper right of FIG. 2 shows the overlap of the two belt members 110 and 120 in the wrapped state, expanded in a plane.

The spirally wrapped telescopic shaft 100 is formed by spirally wrapping the first belt member 110 and the second belt member 120 disposed inside the first belt member 110 around an axis line CX. The first belt member 110 has a first flat belt part 111 and a plurality of first engagement parts 112 aligned in a plurality of rows along a longitudinal direction of the first belt member 110. The first flat belt part 111 is a flat belt-like part with no protrusions or recesses. The first engagement parts 112 are aligned in two rows at regular intervals along the longitudinal direction of the first belt member 110. The second belt member 120 has a second flat belt part 121 and a plurality of second engagement parts 122 aligned in a plurality of rows along a longitudinal direction of the second belt member 120. The second flat belt part 121 is a flat belt-like part with no protrusions or recesses. The second engagement parts 122 are aligned in two rows at regular intervals along the longitudinal direction of the second belt member 120.

In the spirally wrapped telescopic shaft 100 shown at the bottom of FIG. 2, the first belt member 110 is wrapped at a constant pitch Pt along the axis line CX. A distance Le between the rows of the first engagement parts 112 of the two rows along the direction of the axis line CX is equal to ½ of the wrapping pitch Pt. The second belt member 120 also have configurations similar to those stated above.

The first belt member 110 has a width W1, and the second belt member 120 has a width W2. The widths W1 and W2 are approximately equal, and are set to values slightly smaller than the wrapping pitch Pt. The two belt members 110 and 120 are overlapped and spirally wrapped in a state in which they are displaced from each other by ½ of the wrapping pitch Pt. As a result, the first engagement parts 112 of the two rows of the first belt member 110 engage with the second engagement parts 122 of the two second belt members 120 overlapped inside the first belt member 110.

Figure 3:
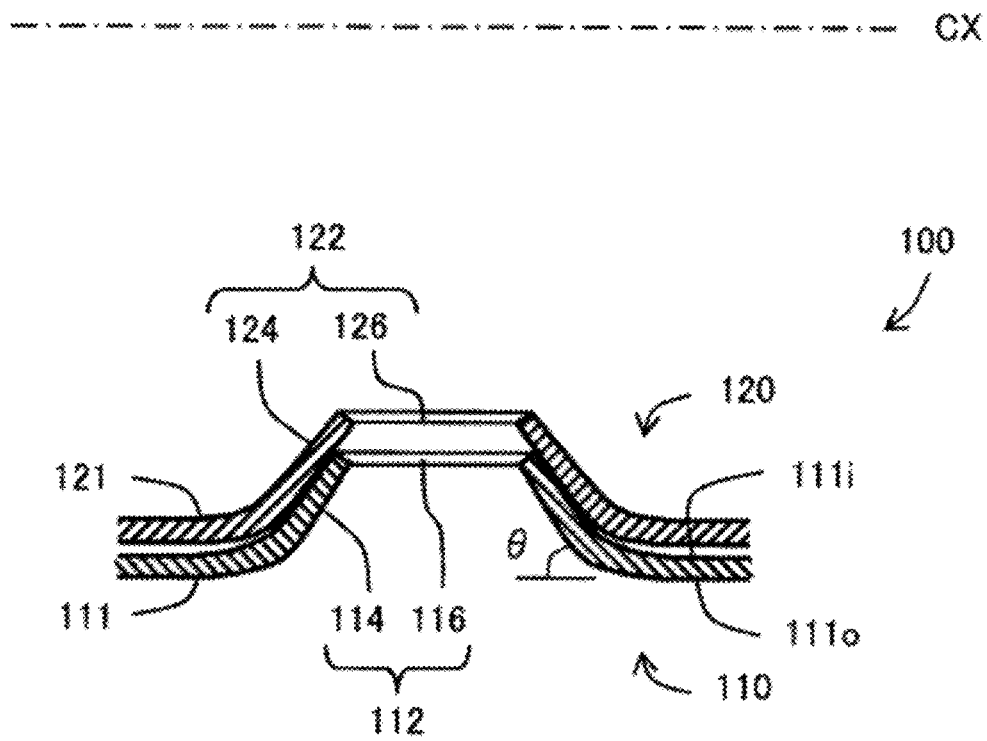
FIG. 3 is a cross-sectional view of a spirally wrapped telescopic shaft according to a first reference example.

FIG. 3 is a cross-sectional view of a spirally wrapped telescopic shaft 100 according to a first reference example. First engagement parts 112 of a first belt member 110 are formed as first hollow protrusion parts 114 projecting toward the axis line CX. Further, each of the first engagement parts 112 has an opening part 116 in the center thereof.

The second engagement parts 122 of the second belt member 120 are configured to fit to the first engagement parts 112 of the first belt member 110. In the first reference example, the second engagement parts 122, like the first engagement parts 112, are also configured as second hollow protrusion parts 124 projecting toward the axis line CX, and each have an opening part 126 in the center thereof. The second engagement parts 122 may be configured to have almost the same shape as the first engagement parts 112, and the size of the convex parts is preferably slightly larger than that of the first engagement parts 112.

The inner surface of the first hollow protrusion parts 114 and the outer surface of the second hollow protrusion parts 124 are configured to make face contact with each other. In this configuration, the contact pressure can be reduced compared to that in a case where the two engagement parts make point contact with each other. As a result, deformation due to contact can be reduced, and noise and vibration can be reduced.

The first hollow protrusion parts 114 are preferably extended in a direction tilted from a first flat belt part 111. The second hollow protrusion parts 124 are also preferably extended in a direction tilted from a second flat belt part 121. Accordingly, both the first hollow protrusion parts 114 and the second hollow protrusion parts 124 can be smoothly engaged with each other while definitely causing the first hollow protrusion parts 114 and the second hollow protrusion parts 124 to make surface contact with each other. An angle θ formed by the first hollow protrusion parts 114 and the first flat belt part 111 is preferably set in a range of 30 degrees to 85 degrees. The same goes for the second hollow protrusion parts 124. In general, as the angle θ becomes larger, an engagement holding force increases. However, if the angle θ is too large, it is possible that resistance may occur when belt members are wrapped or the wrapping is released. By setting the angle θ to be a range of 30° to 85°, it is possible to prevent an excessive resistance from occurring when the belt members are wrapped or the wrapping is released while keeping a large engagement holding force.

The first engagement parts 112 project inward from an inner surface 111i of the first flat belt part 111. On the other hand, there is no part projecting outward from an outer surface 111o of the first flat belt part 111. The second belt member 120 also have configurations similar to those stated above. In the present disclosure, "inward" means the inside of the spirally wrapped telescopic shaft 100, that is, the side of the axis line CX, while "outward" means the outside of the spirally wrapped telescopic shaft 100.

Figure 4:
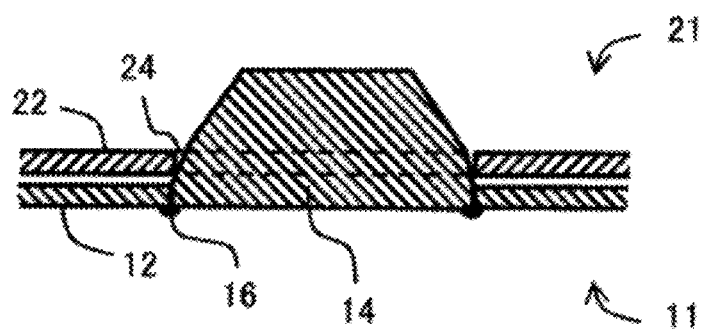
FIG. 4 is a cross-sectional view of a spirally wrapped telescopic shaft according to a comparative example.

FIG. 4 is a cross-sectional view of a spirally wrapped telescopic shaft according to a comparative example. In this comparative example, a first belt member 11 includes a first flat belt part 12 and a solid engagement pin 14. The engagement pin 14 is welded to the first flat belt part 12, and a welding scar 16 projecting outside of the first flat belt part 12 is formed. A second belt member 21 has a second flat belt part 22 and an engagement hole 24.

In the spirally wrapped telescopic shaft according to the comparative example, a large number of engagement pins 14 need to be joined to the first flat belt part 12, which increases the weight and the cost of the first belt member 11. Further, when expansion and contraction of the spirally wrapped telescopic shaft are repeated, it is possible that fatigue breakdown may occur from the place where the engagement pins 14 are joined. Further, since the spirally wrapped telescopic shaft has a part that is projecting outward from the outer surface of the first belt member 11, interference and resistance when the two belt members 110 and 120 are guided by the guide part 30 increase.

On the other hand, in the spirally wrapped telescopic shaft 100 according to the first reference example shown in FIG. 3, the first engagement parts 112 of the first belt member 110 are configured as hollow protrusion parts, whereby it is possible to provide a spirally wrapped telescopic shaft that is lighter and less expensive than that in a case where solid engagement pins are used. Further, since the first hollow protrusion parts 114 of the first belt member 110 and the second hollow protrusion parts 124 of the second belt member 120 make surface contact with each other, the contact pressure can be reduced compared to a case where the two engagement parts make point contact with each other. As a result, deformation due to the contact can be reduced, and noise and vibration can also be reduced. Further, since the first belt member 110 does not include parts projecting outward from the outer surface 111o of the first flat belt part 111, interference and resistance when the two belt members 110 and 120 are guided by the guide part 30 are reduced, whereby the spirally wrapped telescopic shaft 100 can be smoothly expanded or contracted.

Figure 5:
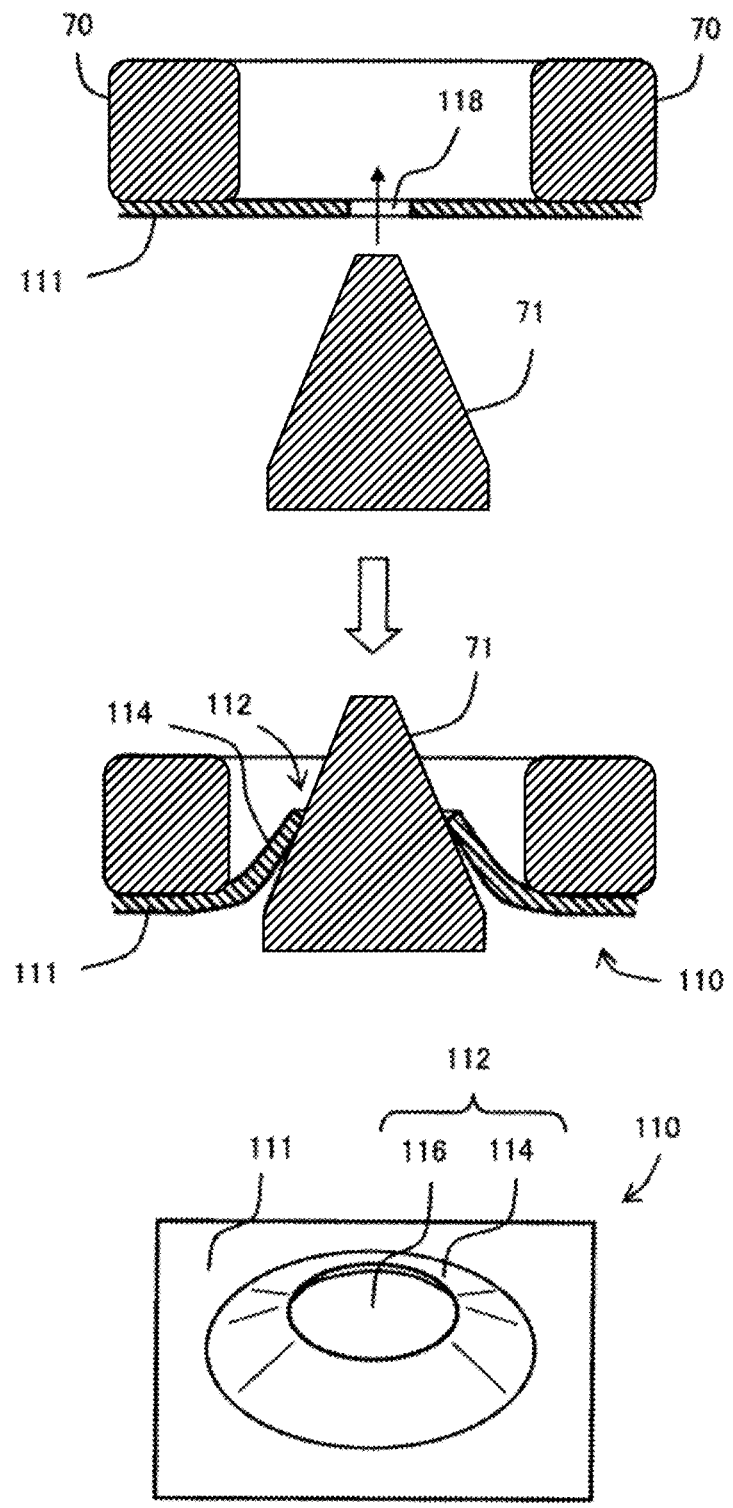
FIG. 5 is an explanatory view showing a press-forming method of a first belt member according to the first reference example.

FIG. 5 is an explanatory view showing a press-forming method of the first belt member 110 according to the first reference example. The upper part of FIG. shows a state before press forming is performed and the central part of FIG. 5 shows a state after press forming is performed. The lower part of FIG. 5 shows a perspective view of the first engagement part 112 of the first belt member 110.

In the state before press forming is performed, a plurality of holes 118 are formed in the first flat belt part 111. A die 70 and a punch 71 can be used for press forming. The die 70 is disposed around the hole 118. When press forming is performed, the punch 71 proceeds toward the holes 118, whereby the first engagement part 112 including the first hollow protrusion part 114 and the opening part 116 is formed. In this manner, the first hollow protrusion part 114 can be configured as a press forming part inwardly protruding from the first flat belt part 111. The second engagement part 122 of the second belt member 120 can also be formed by press forming. By using press forming, the first hollow protrusion part 114 and the second hollow protrusion part 124 can be easily formed.

As will be understood from FIG. 5, the first engagement part 112 according to the first reference example has a conical trapezoidal shape with a hole. The same goes for the second engagement part 122. If the first engagement part 112 is formed by press forming, the angle of the first hollow protrusion part 114 can be set large. As described with reference to FIG. 3, the angle θ formed by the first hollow protrusion part 114 and the first flat belt part 111 is preferably set to a range between 30° and 85°. It is preferable that the boundary part between the first hollow protrusion part 114 and the first flat belt part 111 have a shape such as an R-shape that is gradually deformed, not a sharp-angled shape. It is therefore possible to prevent stress from concentrating in a boundary part between the first hollow protrusion part 114 and the first flat belt part 111.

As described above, in the above-described first reference example, the first engagement parts 112 of the first belt member 110 are formed as first hollow protrusion parts 114, whereby it is possible to provide a telescopic shaft that is lighter and less expensive than that in a case where solid engagement pins are used. Further, since the first hollow protrusion parts 114 and the second hollow protrusion parts 124 are configured to make surface contact with each other, the contact pressure can be reduced compared to a case where the two engagement parts make point contact with each other. As a result, deformation due to the contact can be reduced, and noise and vibration can also be reduced.

Second Reference Example

Figure 6:
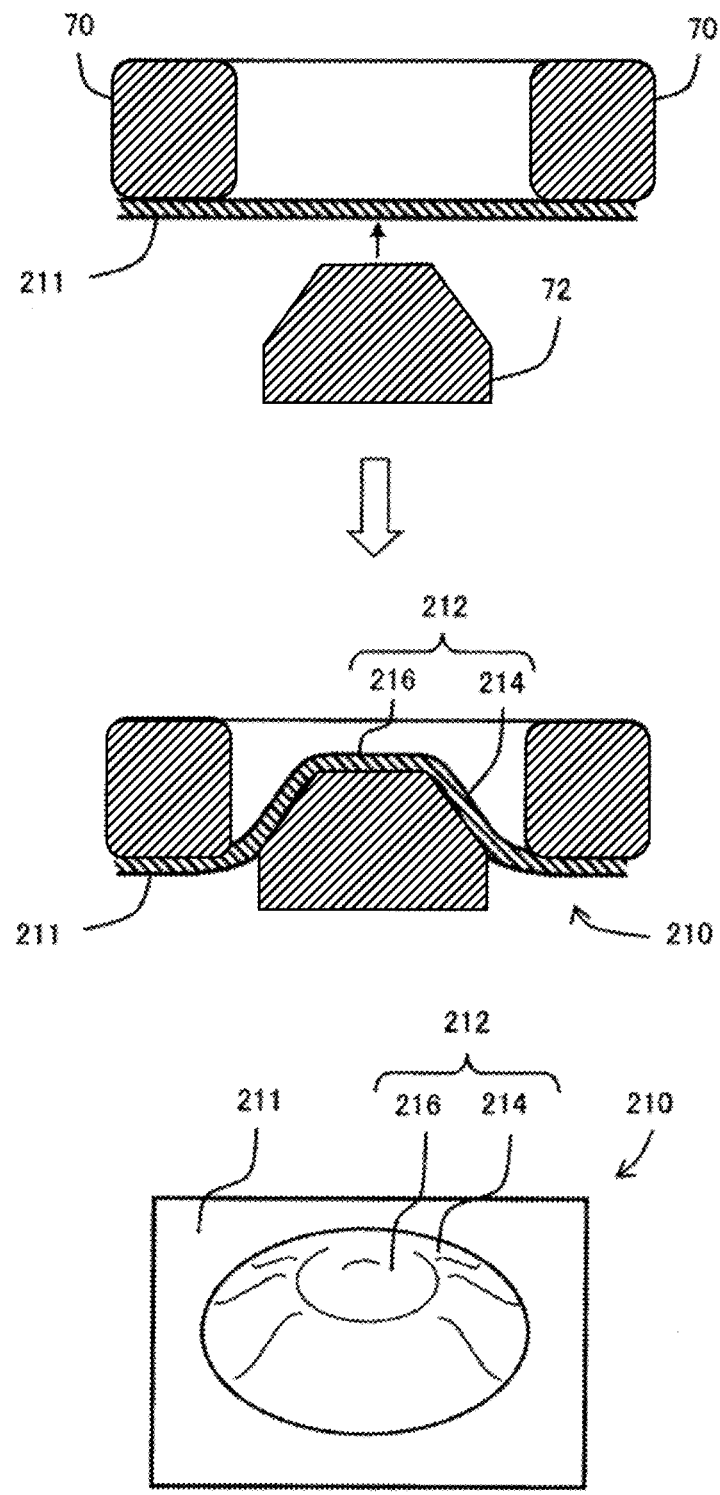
FIG. 6 is an explanatory view showing a press-forming method of a first belt member according to a second reference example.

FIG. 6 is an explanatory view showing a press-forming method of a first belt member 210 according to a second reference example. As shown in the lower part of FIG. 6, the first belt member 210 according to the second reference example includes a first flat belt part 211 and a first engagement part 212, and the first engagement part 212 includes a first hollow protrusion part 214 and a top part 216. There is no opening in the top part 216. In the example shown in FIG. 6, the top part 216 is substantially flat. That is, the first engagement part 212 is formed to have a conical trapezoidal shape whose top part 216 is closed. The top part 216 may be flat or may have a dome shape.

In a state before press forming is performed, no holes are formed in the first flat belt part 211. A die 70 and a punch 72 are used for press forming. The die 70 is disposed around the position where the first engagement part 212 is formed. The punch 72 has a conical trapezoidal shape in accordance with the shape of the first engagement part 212. When press forming is performed, the punch 72 proceeds to the position where the first engagement part 212 is formed, whereby the first engagement part 212 including the first hollow protrusion part 214 and the top part 216 is formed. That is, the first engagement part 212 is press-formed. In this manner, the first hollow protrusion part 214 according to the second reference example may be formed as a press forming part protruded from the first flat belt part 211. The second engagement part of the second belt member can also be formed into a conical trapezoidal shape whose top part is closed by press forming.

In the second reference example, there is no need to form opening parts in the first belt member 210, whereby the manufacturing process may be simplified more than that in the first reference example. However, the first reference example has an advantage that the weight of the first belt member 110 can be further reduced since the first belt member 110 includes the opening part 116. Further, in the first reference example, there is an advantage that the angle θ of the first hollow protrusion part 114 can be easily set to a larger value. The same holds true for the second belt member.

Third Reference Example

Figure 7:
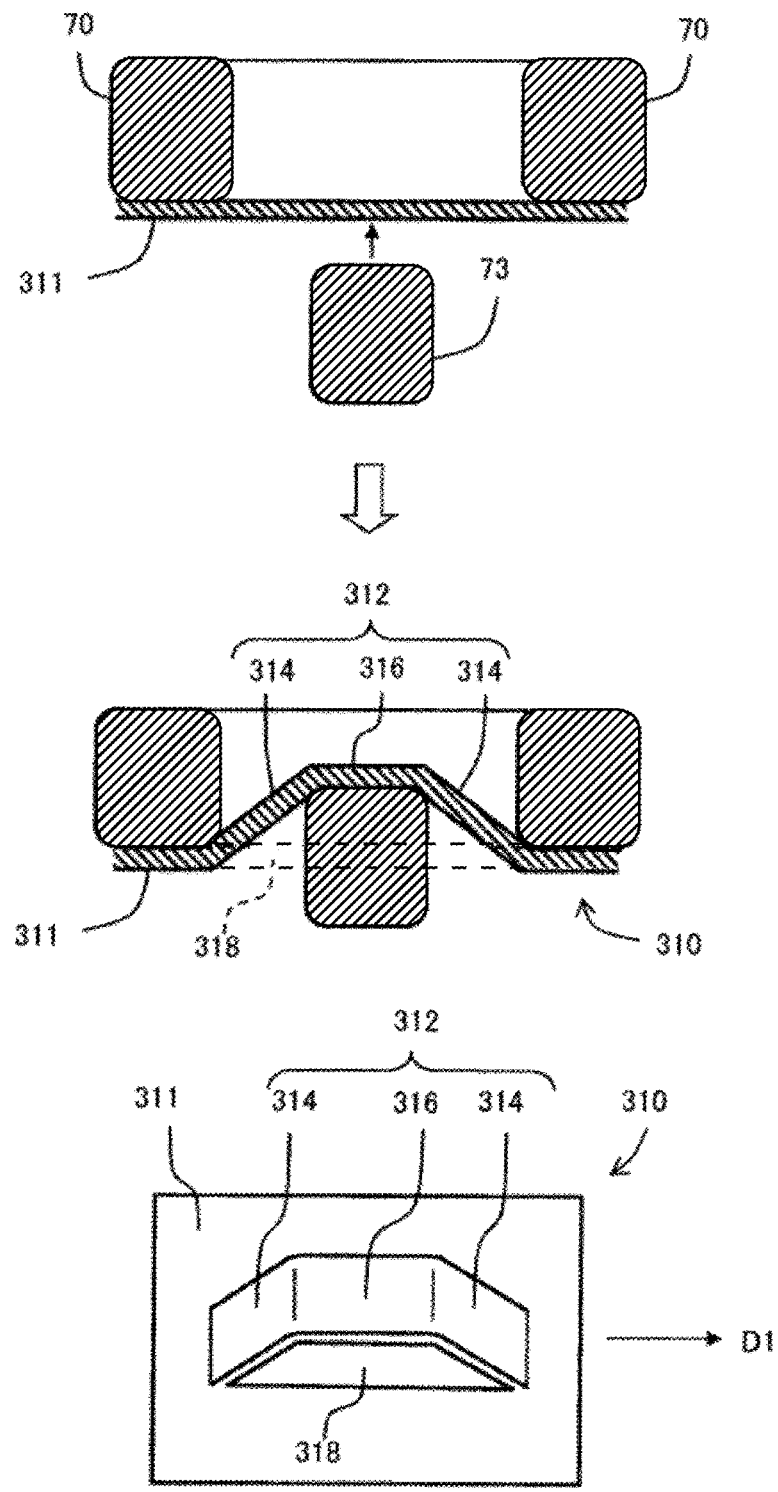
FIG. 7 is an explanatory view showing a press-forming method of a first belt member according to a third reference example.

FIG. 7 is an explanatory view showing a press-forming method of a first belt member 310 according to a third reference example. As shown in the lower part of FIG. 7, the first belt member 310 according to the third reference example includes a first flat belt part 311 and a first engagement part 312. The first engagement part 312 includes first hollow protrusion parts 314 and a top part 316, and has a trapezoidal bridge shape. The first hollow protrusion parts 314 are formed as right and left trapezoidal leg parts, and the top part 316 is formed as an upper bottom part of the trapezoid. Notches 318 are formed on both sides of the first engagement part 312 having a trapezoidal bridge shape. The notches 318 are parts where the first flat belt part 311 and the first engagement part 312 are separated from each other. The notches 318 formed on both sides of the first engagement part 312 communicate with the inside of the first engagement part 312.

There are no openings in the top part 316 of the first engagement part 312, and the top part 316 is substantially flat. The first hollow protrusion parts 314 which are provided on both sides of the top part 316 are substantially flat as well. It is preferable that a direction D1 in which the two first hollow protrusion parts 314 and the top part 316 are aligned be an oblique direction having an appropriate angle smaller than 90 degrees with respect to the longitudinal direction of the first belt member 310. The reason for this is that, if this direction D1 is parallel to the longitudinal direction of the first belt member 310, wrapping can be easily performed but it is likely that the wrapping will come loose, whereas if this direction is vertical to the longitudinal direction of the first belt member 310, it may be difficult to perform wrapping, but it is likely that the force to hold the wrapping will be strong. That is, when the direction D1 is set to a direction that is tilted with respect to the longitudinal direction of the first belt member 310, wrapping can be easily performed and it is also unlikely that the wrapping will come loose.

In a state before press forming is performed, no holes are formed in the first flat belt part 311. However, as shown in the central part of FIG. 7, the notches 318 are formed on both sides of the position where the first engagement part 312 is formed. A die 70 and a punch 73 are used for press forming. The die 70 is disposed around the position where the first engagement part 312 is formed. The punch 73 has a form of a quadrangular prism in accordance with the shape of the first engagement part 312. When press forming is performed, the punch 73 proceeds to the position where the first engagement part 312 is formed, whereby the first engagement part 312 including the first hollow protrusion parts 314 and the top part 316 is formed. In this manner, the first hollow protrusion parts 314 according to the third reference example may be formed as press forming parts projecting from the first flat belt part 311. The second engagement parts of the second belt member may also be formed into a trapezoidal bridge shape by press forming.

In the third reference example, since there is no need to form opening parts, the manufacturing process may be simplified more than that in the first reference example. Further, in the third reference example, engagement can be smoothly performed while bearing forces by both side parts of the first engagement part 312 where the notches 318 are formed. In particular, by forming each of the first engagement part of the first belt member and the second engagement part of the second belt member in a trapezoidal bridge shape, the first engagement part and the second engagement part can be smoothly engaged with each other.

Fourth Reference Example

Figure 8:
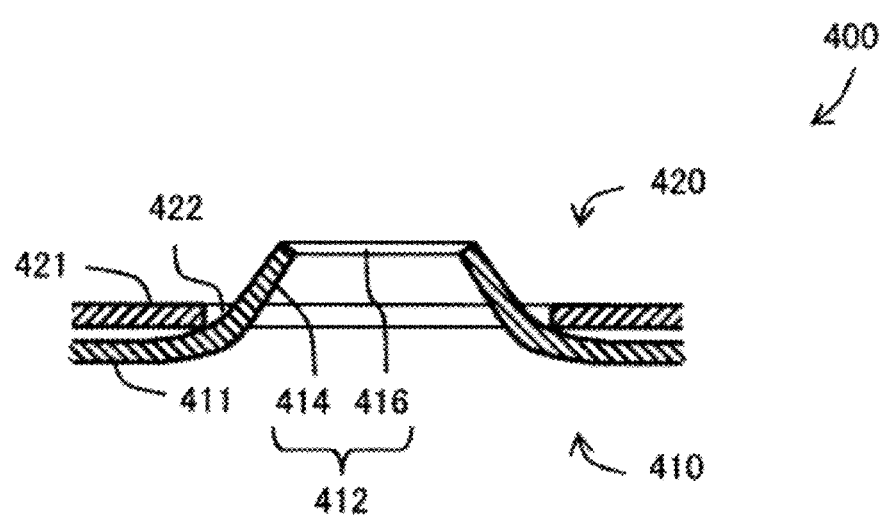
FIG. 8 is a cross-sectional view of a spirally wrapped telescopic shaft according to a fourth reference example.

FIG. 8 is a cross-sectional view of a spirally wrapped telescopic shaft 400 according to a fourth reference example. The spirally wrapped telescopic shaft 400 is formed by spirally wrapping a first belt member 410 and a second belt member 420. The first belt member 410 has a shape similar to that of the first belt member 110 according to the first reference example shown in FIG. 3. That is, the first belt member 410 includes a first flat belt part 411 and a plurality of first engagement parts 412, and each of the first engagement parts 412 includes a first hollow protrusion part 414 and an opening part 416.

The second belt member 420 according to the fourth reference example includes a second flat belt part 421 and a plurality of second engagement parts 422. The second engagement parts 422 are formed as engagement holes. The fourth reference example is similar to the above-described first to third reference examples in that the second engagement parts 422 are configured to be fit to the first hollow protrusion parts 414 of the first engagement parts 412.

In the spirally wrapped telescopic shaft 400 according to the fourth reference example as well, the first engagement parts 412 of the first belt member 410 are formed as first hollow protrusion parts 414, whereby it is possible to provide a telescopic shaft that is lighter and less expensive than that in a case where solid engagement pins are used. In the fourth reference example, however, peripheral edge parts of the second engagement parts 422 of the second belt member 420 are engaged with the first engagement parts 412 of the first belt member 410 in such a way that they make point contact with each other. On the other hand, in the aforementioned first to third reference examples, the first engagement parts and the second engagement parts make surface contact with each other, which offers an advantage that vibration and noise which are caused by point contact are not likely to occur.

Fifth Reference Example

Figure 9:
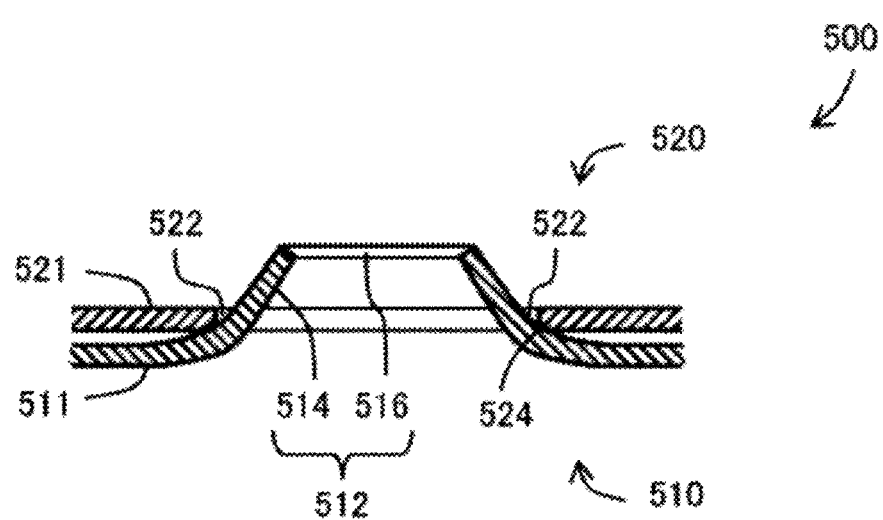
FIG. 9 is a cross-sectional view of a spirally wrapped telescopic shaft according to a fifth reference example.

FIG. 9 is a cross-sectional view of a spirally wrapped telescopic shaft 500 according to a fifth reference example. The spirally wrapped telescopic shaft 500 is formed by spirally wrapping a first belt member 510 and a second belt member 520. The first belt member 510 has a shape similar to that of the first belt member 110 according to the first reference example shown in FIG. 3. That is, the first belt member 510 includes a first flat belt part 511 and a plurality of first engagement parts 512, and each of the first engagement parts 512 includes a first hollow protrusion part 514 and an opening part 516.

The second belt member 520 according to the fifth reference example includes a second flat belt part 521 and a plurality of second engagement parts 522. The second engagement parts 522 are formed as engagement holes. The difference between the fifth reference example and the fourth reference example shown in FIG. 8 is that peripheral edge parts 524 of the holes of the second engagement parts 522 that contact the first engagement parts 512 are chamfered in the fifth reference example. The peripheral edge parts 524 may be subjected to R machining instead of being chamfered. Accordingly, the size of the area where the first engagement part 512 contacts the second engagement parts 522 can be made larger than that in the fourth reference example, whereby vibration and noise which are caused by point contact are not likely to occur.

Embodiments

First, a problem found by the present inventors in the telescopic device 60 (spiral advancing and retreating operation device) of the above reference examples will be described.

As described above, in the aforementioned first reference example, the telescopic device 60 (spiral advancing and retreating operation device) forms the spirally wrapped telescopic shaft 100 (one example of a tubular telescopic body according to the present disclosure) by spirally wrapping the first belt member 110 (one example of a first belt member according to the present disclosure) and the second belt member 120 (one example of a second belt member according to the present disclosure) disposed inside the first belt member 110 around the common axis line CX in an overlapping manner in a state in which the first belt member 110 and the second belt member 120 are displaced from each other in the direction of the axis line CX (displaced from each other by half a width).

For example, the first belt member 110 according to the aforementioned first reference example includes the first row of engagement protrusions L1 and the second row of engagement protrusions L2 (see FIG. 2) formed of the plurality of first hollow protrusion parts 114 (see FIG. 3, one example of engagement protrusions according to the present disclosure, also referred to as engagement protrusions 114 below) that are disposed in the longitudinal direction of the first belt member 110 and are convex toward the axis line CX.

On the other hand, the second belt member 120 according to the above first reference example includes the first row of engagement parts L3 and the second row of engagement parts L4 (see FIG. 2) formed of the plurality of second engagement parts 122 (one example of engagement parts according to the present disclosure) disposed in the longitudinal direction of the second belt member 120.

The second engagement parts 122 are configured as second hollow protrusion parts 124 that are convex toward the axis line CX in such a way that the first hollow protrusion parts 114 can be detachably engaged with the second engagement parts 122 in a state in which the first belt member 110 and the second belt member 120 are spirally wrapped in an overlapping manner (see FIG. 3).

As described above, when the belt member having hollow protrusion parts, that is, the first belt member 110 including the first hollow protrusion parts 114 (see FIG. 3) according to the first reference example and the second belt member 120 including the second hollow protrusion parts 124 (see FIG. 3) according to the first reference example, is used, the following problem occurs. The same goes for a case where the first belt member 210 including the first hollow protrusion parts 214 (see FIG. 6) according to the second reference example, the first belt member 410 including the first hollow protrusion parts 414 (see FIG. 8) according to the fourth reference example, and the first belt member 510 including the first hollow protrusion parts 514 (see FIG. 9) according to the fifth reference example are used.

Hereinafter, the above problem will be described taking the first belt member 110 including the first hollow protrusion parts 114 (see FIG. 3) according to the first reference example as an example.

Figure 10A:
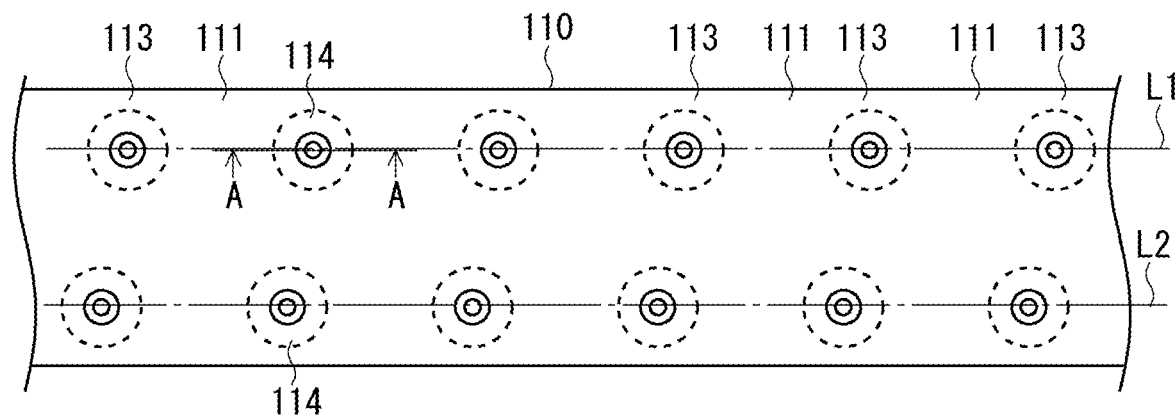
FIG. 10A is a plan view of a first belt member 110.
Figure 10B:
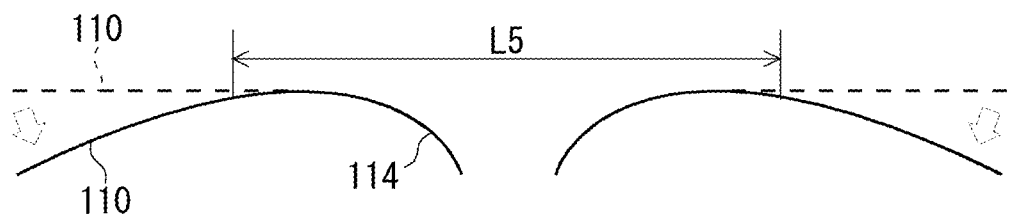
FIG. 10B a cross-sectional view taken along the line A-A of FIG. 10A.
Figure 10C:
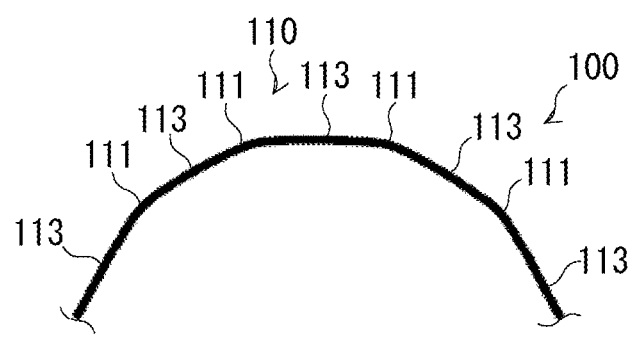
FIG. 10C is a diagram showing that the entire spirally wrapped telescopic shaft 100 has a polygonal shape when the first belt member 110 shown in FIG. 10A is spirally wrapped.

FIG. 10A is a plan view of the first belt member 110. FIG. 10B is a cross-sectional view taken along the line A-A of FIG. 10A. In FIG. 10B, the first belt member 110 drawn by the dotted line shows a state before it is spirally wrapped. On the other hand, in FIG. 10B, the first belt member 110 drawn by the solid line shows a state after it is spirally wrapped. Further, a reference symbol L5 in FIG. 10B shows a range where the first belt member 110 is hardly deformed when the first belt member 110 is spirally wrapped, that is, a part of the first belt member 110 whose rigidity is higher than the other surrounding part of the first belt member 110. Hereinafter, this part of the first belt member 110 whose rigidity is higher than the other surrounding part of the first belt member 110 is referred to as a belt part with protrusions 113. FIG. 10C is a diagram showing that the entire spirally wrapped telescopic shaft 100 has a polygonal shape when the first belt member 110 shown in FIG. 10A is spirally wrapped.

As shown in FIG. 10A, the first belt member 110 includes a first flat belt part 111 and a belt part with protrusions 113 alternately arranged in the longitudinal direction of the first belt member 110.

Since the belt part with protrusions 113 includes one engagement protrusion 114 that forms a first row of engagement protrusions L1 and one engagement protrusion 114 that forms a second row of engagement protrusions L2, the belt part with protrusions 113 has a rigidity higher than that of the other surrounding part (the first flat belt part 111) and therefore it is not likely to be deformed (it is not likely to have a cylindrical shape). Therefore, when the first belt member 110 in which the first flat belt part 111 and the belt part with protrusions 113 are alternately arranged is spirally wrapped, as shown in FIG. 10C, the entire spirally wrapped telescopic shaft 100 has a polygonal shape.

Although it is originally required that the first belt member 110 and the second belt member 120 be double cylinders with a certain appropriate clearance between them, when the first belt member 110 is deformed as described above into a polygonal shape, the clearance between them varies for each part. Therefore, there is a problem that a desired shaft shape cannot be maintained.

Further, when the spirally wrapped telescopic shaft 100 having a predetermined outer diameter is formed while spirally wrapping the first belt member 110 and the second belt member 120 in an overlapping manner, the first belt member 110 ejected from the first accommodating part 10, which is a storage part of the first belt member 110, and the second belt member 120 ejected from the second accommodating part 20, which is a storage part of the second belt member 120, are wrapped while causing the first hollow protrusion parts 114 and the second engagement parts 122 to engaged with each other via the guide part 30.

However, when the first belt member 110 is deformed as described above into a polygonal shape, there is a problem that the first belt member 110 (corner parts of the polygonal shape), when it passes through the guide part 30, interferes with the guide part 30, which causes noise and friction.

Figure 11A:
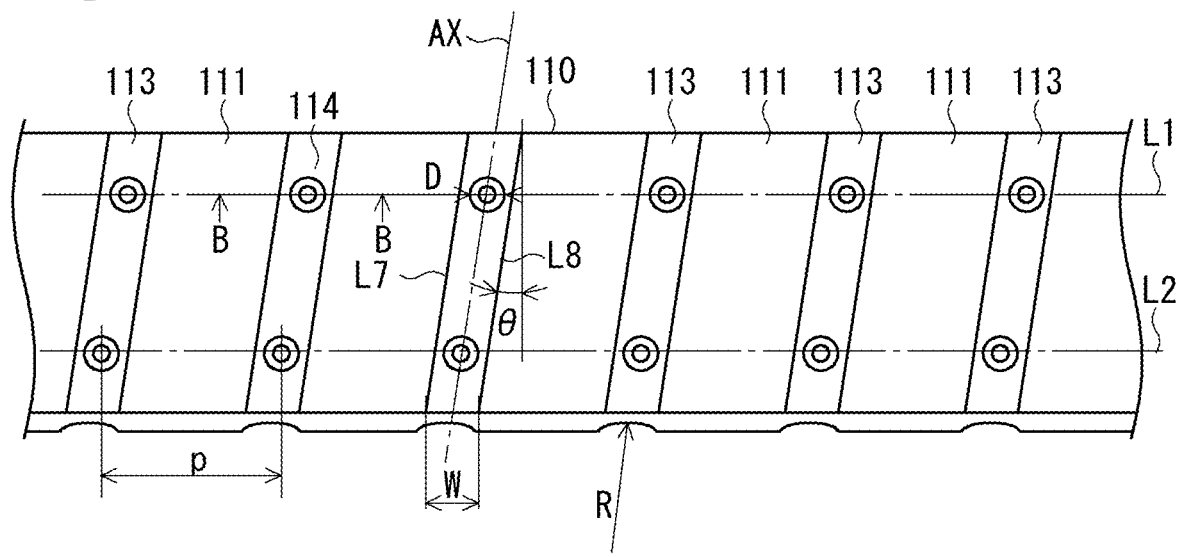
FIG. 11A is a perspective view of the first belt member 110.
Figure 11B:
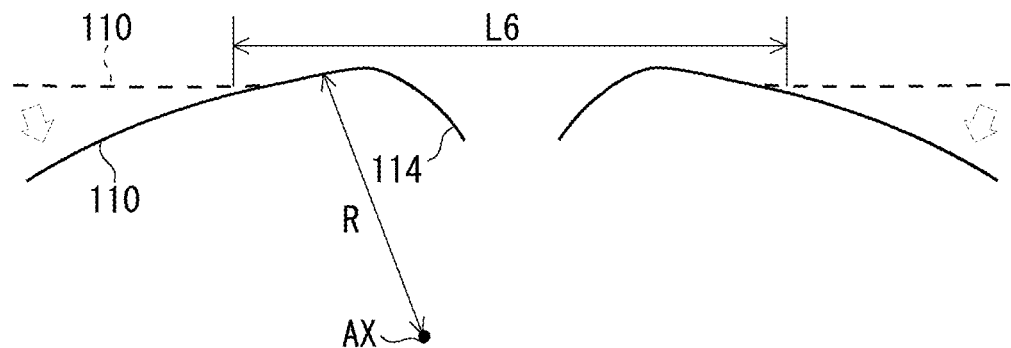
FIG. 11B is a cross-sectional view taken along the line B-B of FIG. 11A.
Figure 11C:
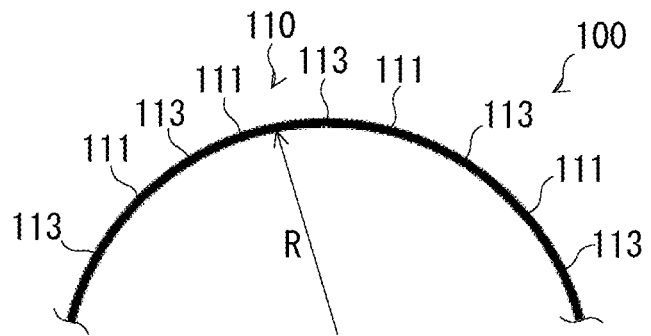
FIG. 11C is a diagram showing that the entire spirally wrapped telescopic shaft 100 has a cylindrical shape when the first belt member 110 shown in FIG. 11A is spirally wrapped.

Next, as the embodiment, a configuration example for solving the aforementioned problem, that is, a configuration example for making, when the first belt member 110 in which the first flat belt part 111 and the belt part with protrusions 113 are alternately arranged is spirally wrapped, as shown in FIG. 11C, the entire spirally wrapped telescopic shaft 100 have a cylindrical shape, not a polygonal shape, will be described. Note that this configuration example may be applied not only to the first belt member 110 having the first hollow protrusion parts 114 (see FIG. 3) according to the first reference example but also to the second belt member 120 including the second hollow protrusion parts 124 (see FIG. 3) according to the first reference example, the first belt member 210 including the first hollow protrusion parts 214 (see FIG. 6) according to the second reference example, the first belt member 410 including the first hollow protrusion parts 414 (see FIG. 8) according to the fourth reference example, and the first belt member 510 including the first hollow protrusion parts 514 (see FIG. 9) according to the fifth reference example. Further, this configuration example can also be applied to the aforementioned comparative example.

That is, this configuration example can be applied to the belt member including a part whose rigidity is higher (e.g., the belt part with protrusions 113) than the other surrounding part (e.g., the first flat belt part 111), the belt member being used as the first belt member 110 (first belt member) or the second belt member 120 (second belt member) of the telescopic device 60 (spiral advancing and retreating operation device).

Hereinafter, a representative example of applying the above configuration example to the first belt member 110 according to the first reference example will be described.

FIG. 11A is a perspective view of the first belt member 110. FIG. 11B is a cross-sectional view taken along the line B-B of FIG. 11A. In FIG. 11B, the first belt member 110 drawn by a dotted line shows a state in which the first belt member 110 is spirally wrapped. On the other hand, in FIG. 11B, the first belt member 110 drawn by a solid line shows a state after the first belt member 110 is spirally wrapped. Further, a reference symbol L6 in FIG. 11B, which corresponds to the reference symbol L5 in FIG. 10B, is a range in which the first belt member 110 is formed into a cylindrical shape that corresponds to the spirally wrapped telescopic shaft 100 (one example of a tubular telescopic body according to the present disclosure) in advance. In FIG. 11A, a part between lines L7 and L8 of the first belt member 110 that is tilted by the wrapping lead angle θ with respect to the short-length direction is the part with protrusions 113. FIG. 11C is a diagram showing that the entire spirally wrapped telescopic shaft 100 has a cylindrical shape when the first belt member 110 in FIG. 11A is spirally wrapped.

In this embodiment, a part of the first belt member 110 whose rigidity is higher than the other surrounding part (e.g., the flat belt part 111) of the first belt member 110, that is, the belt part with protrusions 113, is curved into a cylindrical shape that corresponds to the spirally wrapped telescopic shaft 100 in advance.

A central axis AX having a cylindrical shape is extended in a direction that is tilted by the wrapping lead angle θ with respect to the short-length direction of the first belt member 110 (see FIGS. 11A and 11B). This is merely an example, and the central axis AX of this cylindrical shape may be extended in a direction (e.g., short-length direction of the first belt member 110) other than the direction tilted by the wrapping lead angle θ with respect to the short-length direction of the first belt member 110.

Further, a radius of the cylindrical shape is equal to or larger than a radius R of the spirally wrapped telescopic shaft 100. This is merely an example, and the radius of the cylindrical shape may become larger as the distance from the first hollow protrusion part 114 (one example of an engagement protrusion according to the present disclosure) increases in the longitudinal direction of the first belt member 110.

In FIG. 11A, the symbol W denotes a width of the cylindrical shape (width of the cylindrical surface). Further, the symbol D denotes a diameter of the root of the first hollow protrusion part 114. It is desirable that the width of the cylindrical shape (width of the cylindrical surface) W be adjusted in a range of diameter D of the root of the first hollow protrusion part 114×1.0 to 2.0. If the range is much smaller than this range, the accuracy of the cylinder is not sufficiently high. On the other hand, if the range is much larger than the above range, the load during forming increases. It is therefore desirable to select appropriate dimensions.

Further, in FIG. 11A, the symbol θ denotes a plane angle or a wrapping lead angle. Further, in FIG. 11A, the symbol R denotes the radius of the above cylindrical shape (cylindrical surface). It is desirable that the radius R be formed using an appropriate press mold R in view of springback during press forming that will be described later. When, for example, the spirally wrapped telescopic shaft 100 having a radius of 100 mm is formed, it is desirable that an upper mold 600 and lower molds 601 and 602 with which the radius after springback becomes 100 mm be used.

As described above, by causing the belt part with protrusions 113 whose rigidity is higher than that of the surrounding to be curved into a cylindrical shape that corresponds to the spirally wrapped telescopic shaft 100 in advance, when the first belt member 110 in which the first flat belt part 111 and the belt part with protrusions 113 are alternately arranged is spirally wrapped, as shown in FIG. 11C, the entire spirally wrapped telescopic shaft 100 may be formed into a cylindrical shape, not a polygonal shape.

As a result, the aforementioned problem can be solved. That is, it is possible to form a double-cylinder-type spirally wrapped telescopic shaft 100 in which the clearance between the first belt member 110 and the second belt member 120 does not vary for each part and thus a certain appropriate clearance is maintained between the first belt member 110 and the second belt member 120. As a result, it is possible to form the spirally wrapped telescopic shaft 100 capable of maintaining a desired shaft shape.

Further, since the belt part with protrusions 113 whose rigidity is higher than the other surrounding part is curved into a cylindrical shape that corresponds to the spirally wrapped telescopic shaft 100 in advance, when the first belt member 110 ejected from the first accommodating part 10, which is a storage part of the first belt member 110, is wrapped while causing the first hollow protrusion parts 114 and the second engagement parts 122 to engage with each other through the guide part 30, it is possible to prevent the first belt member 110 (corner parts of the polygonal shape) from interfering with the guide part 30 and the like and thus prevent noise and friction from occurring.

Figure 12A:
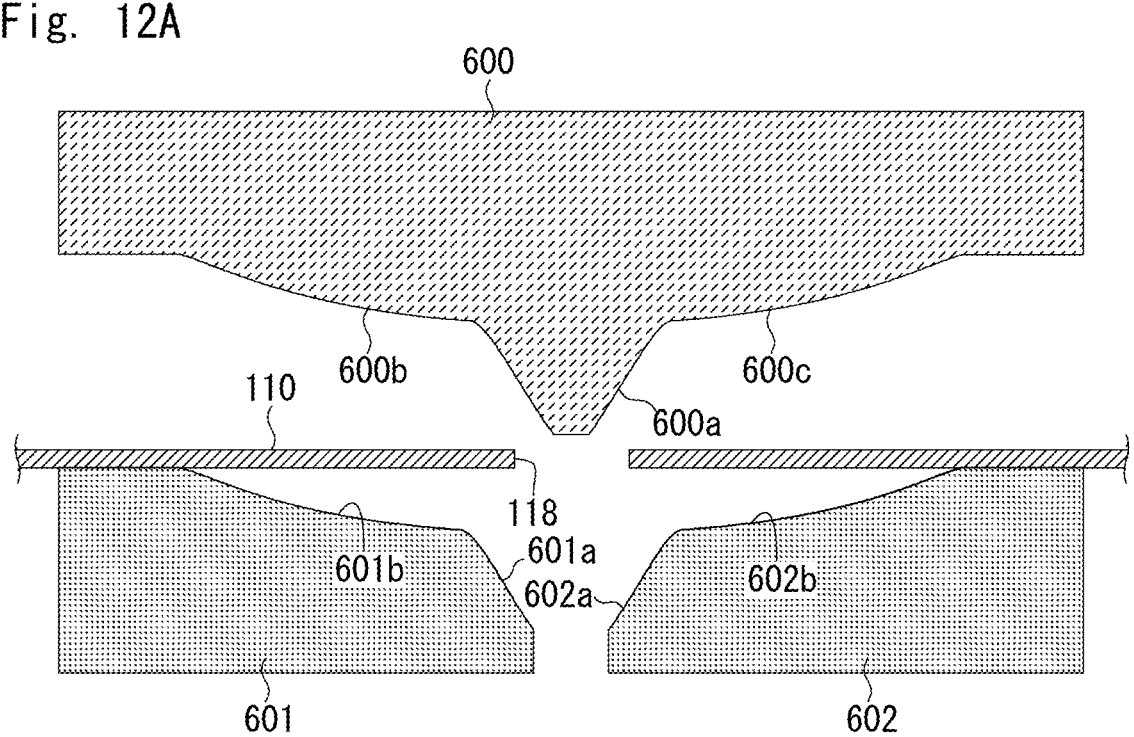
FIG. 12A is a diagram showing the first belt member 110 before press forming is performed.
Figure 12B:
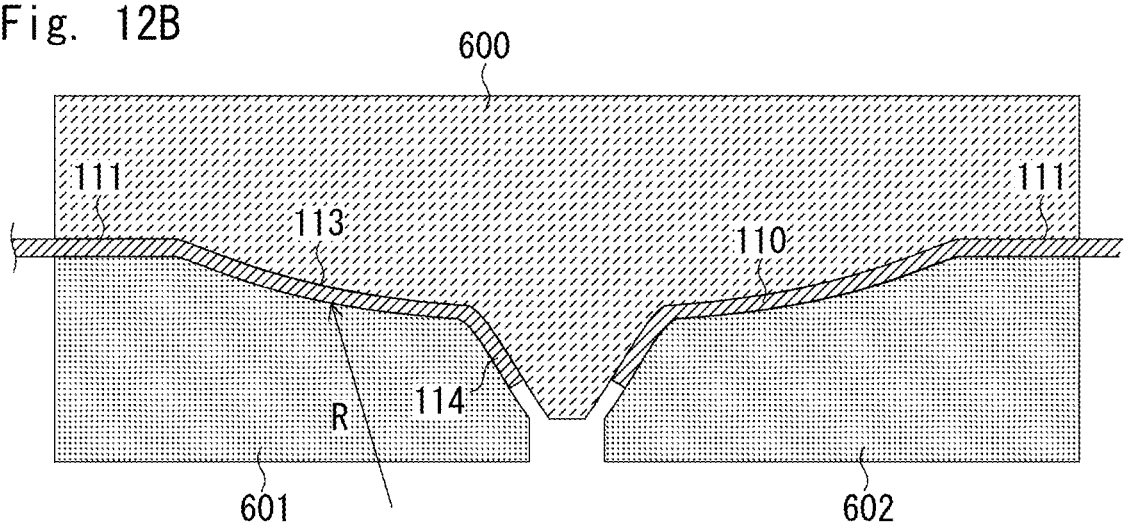
FIG. 12B is a diagram showing the first belt member 110 after press forming is performed.

In addition, according to the cylindrical shape forming method (press-forming method) shown in FIGS. 12A and 12B, the first hollow protrusion parts 114 and the belt part with protrusions 113 that is curved into a cylindrical shape corresponding to the spirally wrapped telescopic shaft 100 in advance can be concurrently formed. Accordingly, it is possible to reduce the cost and to improve productivity without increasing the number of processes.

As shown in FIG. 12A, the first hollow protrusion parts 114 and the belt part with protrusions 113 that is curved into a cylindrical shape corresponding to the spirally wrapped telescopic shaft 100 can be concurrently formed since the following cylindrical shape forming method (press-forming method) is performed using an upper mold 600 (one example of a first mold according to the present disclosure) including a first protruding mold part 600a that corresponds to the first hollow protrusion part 114 (one example of a protrusion according to the present disclosure) and second protruding mold parts 600b and 600c that correspond to the cylindrical shape, and lower molds 601 and 602 (one example of a second mold according to the present disclosure) including first recessed mold parts 601a and 602a that correspond to the first protruding mold part 600a and second recessed mold parts 601b and 602b that correspond to the second protruding mold parts 600b and 600c.

Next, a cylindrical shape forming method (press-forming method) for causing a part of the first belt member 110 whose rigidity is higher than the other surrounding part (e.g., flat belt part 111), that is, the belt part with protrusions 113, to be curved into a cylindrical shape that corresponds to the spirally wrapped telescopic shaft 100 in advance will be described.

FIG. 12A is a diagram showing the first belt member 110 before press forming is performed and FIG. 12B is a diagram showing the first belt member 110 after press forming is performed.

Figure 13:
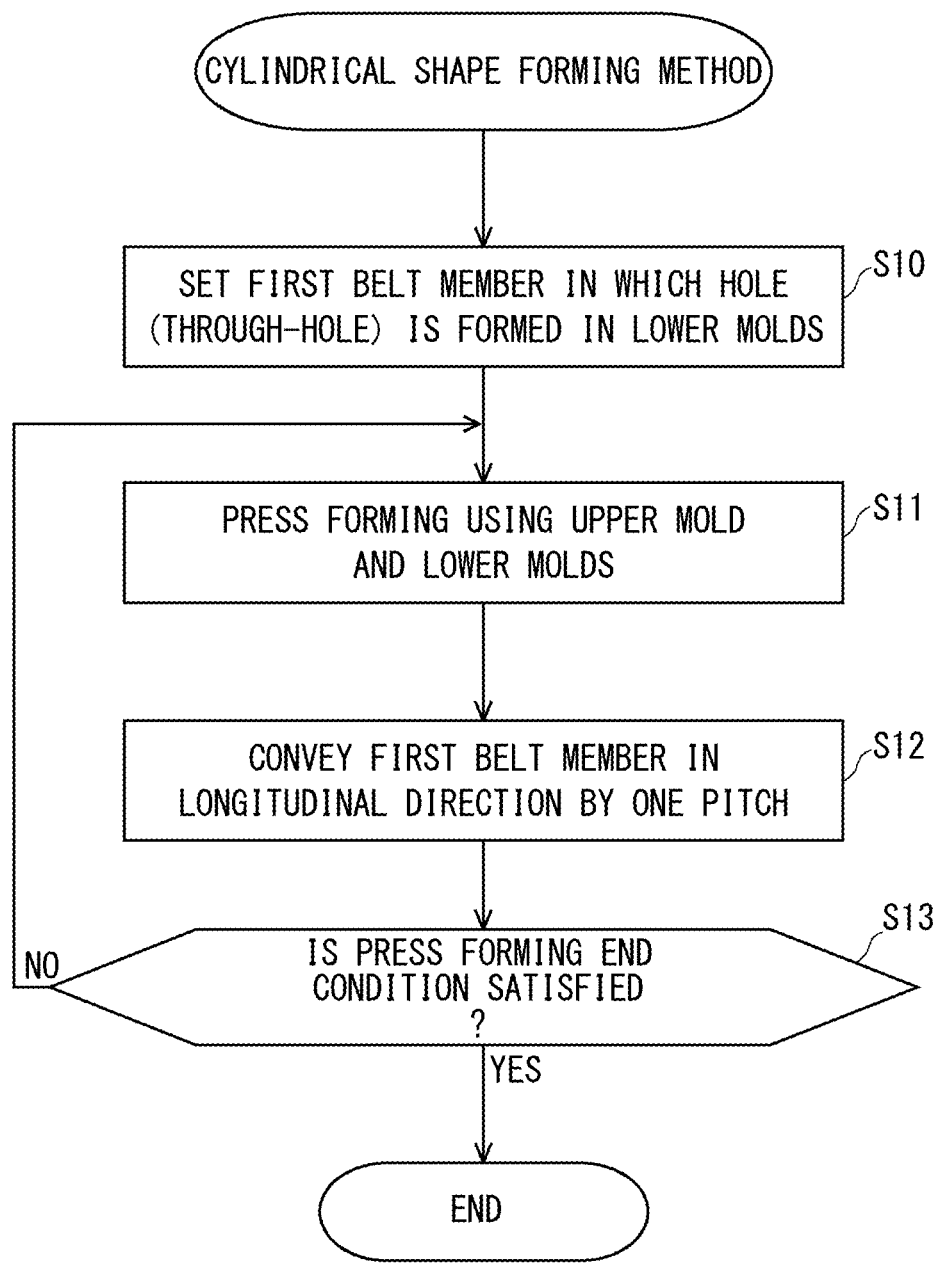
FIG. 13 is a flowchart of a cylindrical shape forming method (press-forming method)

FIG. 13 is a flowchart of the cylindrical shape forming method (press-forming method).

First, as shown in FIG. 12A, the first belt member 110 in which a hole 118 (through-hole) is formed is set in the lower molds 601 and 602 (Step S10). Next, as shown in FIG. 12B, by performing press forming (Step S11) using the upper mold 600 and the lower molds 601 and 602, a part of the first belt member 110 whose rigidity is higher than the other surrounding part (e.g., the flat belt part 111) of the first belt member 110, that is, the belt part with protrusions 113, is curved into a cylindrical shape that corresponds to the spirally wrapped telescopic shaft 100 in advance. Next, the first belt member 110 is conveyed in the longitudinal direction by one pitch p (see FIG. 11A) (Step S12). The above processing of Steps S11 and S12 is repeatedly executed (Step S13: NO) until a press forming end condition is satisfied (Step S13: YES). When the press forming end condition is satisfied (Step S13: YES), the press forming is ended. The press forming end condition is, for example, a condition that a predetermined number of times of pressing has been executed.

As described above, according to this embodiment, when belt members are spirally wrapped, the entire spirally wrapped telescopic shaft 100 (tubular telescopic body) can be formed into a cylindrical shape, not a polygonal shape.

This is because a part of the belt member (e.g., the first belt member 110) whose rigidity is higher than the other surrounding part (e.g., belt part with protrusions 113) is curved into a cylindrical shape that corresponds to the spirally wrapped telescopic shaft 100 (tubular telescopic body) in advance.

Next, a modified example will be described.

Figure 14:
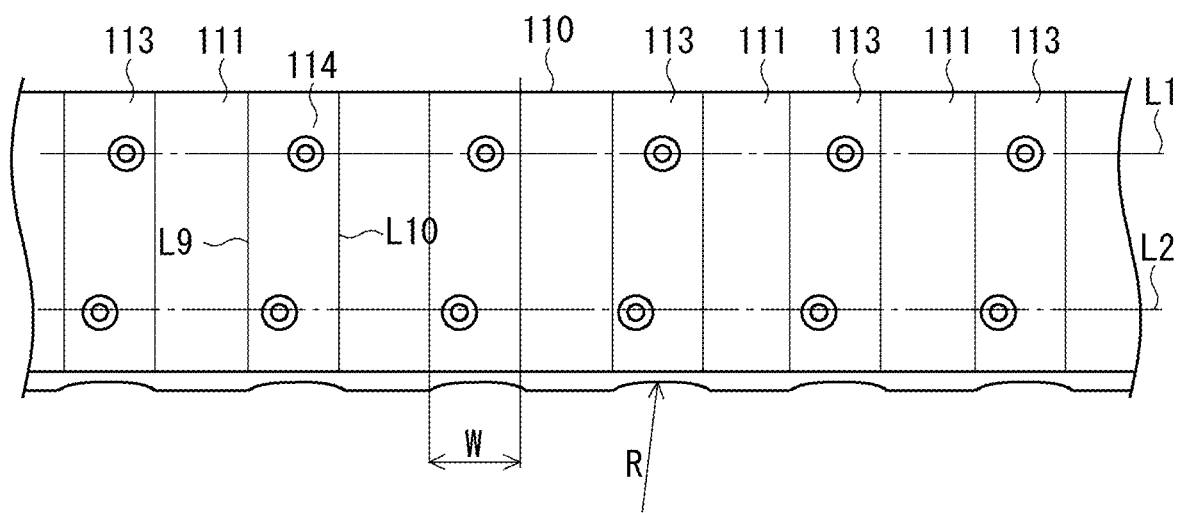
FIG. 14 is a diagram showing a first belt member 110 according to a modified example.

FIG. 14 is a diagram showing a first belt member 110 according to a modified example.

While the example in which a part of the first belt member 110 between the lines L7 and L8 that is tilted by the wrapping lead angle θ with respect to the short-length direction is the belt part with protrusions 113 (see FIG. 11A) has been described in the embodiment, this is merely an example. For example, as shown in FIG. 14, the belt part with protrusions 113 may be a part of the first belt member 110 between lines L9 and L10 that are extended in the short-length direction.

With the above configuration as well, effects similar to those in the above embodiment can be achieved.

Further, while the case where a part that is curved into a cylindrical shape corresponding to the spirally wrapped telescopic shaft 100 in advance is the entire belt part with protrusions 113 (the entire first belt member 110 in the width direction (short-length direction)) (see FIG. 11A) has been described in the above embodiment, this is merely an example.

Figure 15:
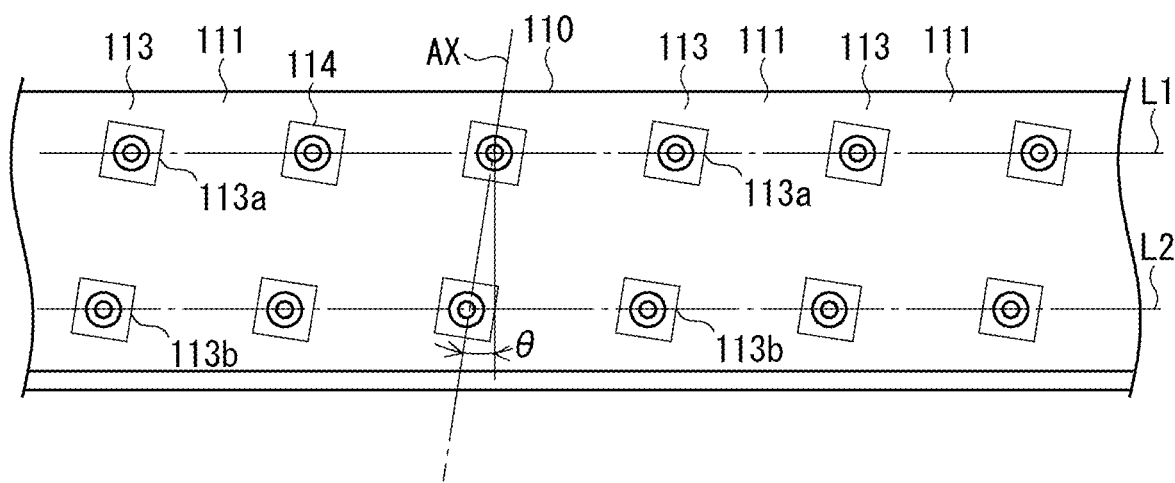
FIG. 15 is a diagram showing a first belt member 110 according to another modified example.

FIG. 15 is a diagram showing a first belt member 110 according to another modified example.

As shown in FIG. 15, a part that is curved into a cylindrical shape corresponding to the spirally wrapped telescopic shaft 100 in advance may be parts 113a and 113b of the belt part with protrusions 113. The part 113a (one example of a first part according to the present disclosure) of the belt part with protrusions 113 includes one engagement protrusion 114 that forms the first row of engagement protrusions L1. On the other hand, the part 113b (one example of a second part according to the present disclosure) of the belt part with protrusions 113 includes one engagement protrusion 114 that forms the second row of engagement protrusions L2.

According to the above configuration as well, effects similar to those in the above embodiment can be achieved.

The numerical values shown in the above embodiment are all examples, and it is needless to say that other appropriate numerical values may be used.

The foregoing embodiment is merely illustrative in every respect. The description of the foregoing embodiment is not intended to be a limited interpretation of the present disclosure. The present disclosure may be implemented in various other forms without departing from its spirit or principal features.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A spiral advancing and retreating operation device, comprising:
   a tubular telescopic body formed by spirally wrapping a first belt member and a second belt member disposed inside the first belt member around a common axis line in an overlapping manner in a state in which the first belt member and the second belt member are displaced from each other in a direction of the common axis line, wherein
   the first belt member comprises a first row of engagement protrusions and a second row of engagement protrusions formed of a plurality of engagement protrusions that are disposed in a longitudinal direction of the first belt member and are convex toward the common axis line,
   the second belt member comprises a first row of engagement parts and a second row of engagement parts formed of a plurality of engagement parts disposed in a longitudinal direction of the second belt member,
   the plurality of engagement parts is configured in such a way that the plurality of engagement protrusions can be detachably engaged therewith in a state in which the first belt member and the second belt member are spirally wrapped in the overlapping manner, and
   a part of the first belt member whose rigidity is higher than another surrounding part of the first belt member is curved into a cylindrical shape that corresponds to the tubular telescopic body.

2. The spiral advancing and retreating operation device according to claim 1, wherein
   the first belt member comprises a flat belt part and a belt part with engagement protrusions alternately arranged in the longitudinal direction of the first belt member,
   the belt part with engagement protrusions comprises
      one of the engagement protrusions in the first row of engagement protrusions, and
      one of the engagement protrusions in the second row of engagement protrusions, and
   the part of the first belt member whose rigidity is higher than the another surrounding part of the first belt member is the belt part with engagement protrusions.

3. The spiral advancing and retreating operation device according to claim 2, wherein
the belt part with engagement protrusions is tilted by a predetermined angle with respect to a short-length direction of the first belt member.

4. The spiral advancing and retreating operation device according to claim 2, wherein
the part of the first belt member whose rigidity is higher than the another surrounding part of the first belt member includes
a first part including one of the engagement protrusions in the first row of engagement protrusions of the belt part with engagement protrusions, and
a second part including one of the engagement protrusions in the second row of engagement protrusions of the belt part with engagement protrusions.

5. The spiral advancing and retreating operation device according to claim 1, wherein
a radius of the cylindrical shape is equal to or larger than a radius of the tubular telescopic body.

6. The spiral advancing and retreating operation device according to claim 5, wherein
the radius of the cylindrical shape becomes larger as a distance from the plurality of engagement protrusions increases in the longitudinal direction of the first belt member.

7. The spiral advancing and retreating operation device according to claim 1, wherein
the plurality of engagement protrusions includes hollow protrusion parts that are integrally formed in the first belt member.

8. The spiral advancing and retreating operation device according to claim 7, wherein
the hollow protrusion parts are hollow conical trapezoidal protrusion parts.

9. A belt member being a first belt member or a second belt member of a spiral advancing and retreating operation device, the spiral advancing and retreating operation device having a tubular telescopic body formed by spirally wrapping the first belt member and the second belt member disposed inside the first belt member around a common axis line in an overlapping manner in a state in which the first belt member and the second belt member are displaced from each other in a direction of the common axis line, the belt member comprising:
a first row of protrusions and a second row of protrusions formed of a plurality of protrusions that are disposed in a longitudinal direction of the belt member and are convex toward the common axis line, wherein
a part of the belt member whose rigidity is higher than another surrounding part of the belt member is curved into a cylindrical shape that corresponds to the tubular telescopic body.

10. A method of manufacturing a belt member,
the belt member being a first belt member or a second belt member of a spiral advancing and retreating operation device,
the spiral advancing and retreating operation device having a tubular telescopic body formed by spirally wrapping the first belt member and the second belt member disposed inside the first belt member around a common axis line in an overlapping manner in a state in which the first belt member and the second belt member are displaced from each other in a direction of the common axis line,
the belt member including a first row of protrusions and a second row of protrusions formed of a plurality of protrusions that are disposed in a longitudinal direction of the belt member and are convex toward the common axis line, and
a part of the belt member whose rigidity is higher than another surrounding part of the belt member being curved into a cylindrical shape that corresponds to the tubular telescopic body,
the method comprising:
performing press forming on the belt member using
a first mold including a first protruding mold part that corresponds to the plurality of protrusions and a second protruding mold part that corresponds to the cylindrical shape, and
a second mold including a first recessed mold part that corresponds to the first protruding mold part and a second recessed mold part that corresponds to the second protruding mold part, whereby the plurality of protrusions and the cylindrical shape are concurrently formed.

* * * * *